(12) United States Patent
Yi et al.

(10) Patent No.: US 8,368,764 B2
(45) Date of Patent: Feb. 5, 2013

(54) DIGITAL PHOTOGRAPHING APPARATUS AND METHOD FOR CONTROLLING THE SAME

(75) Inventors: Dong Yi, Seongnam-si (KR); Byung-kwon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 995 days.

(21) Appl. No.: 11/975,032

(22) Filed: Oct. 16, 2007

(65) Prior Publication Data

US 2008/0170129 A1 Jul. 17, 2008

(30) Foreign Application Priority Data

Jan. 17, 2007 (KR) .................. 10-2007-0005447

(51) Int. Cl.
*H04N 5/228* (2006.01)
*H04N 7/18* (2006.01)
*H04N 5/225* (2006.01)
*H04N 5/232* (2006.01)
*G03B 13/00* (2006.01)
*G03B 3/10* (2006.01)
*G03B 13/34* (2006.01)

(52) U.S. Cl. .................. 348/208.1; 348/143; 348/218.1; 348/346; 396/123

(58) Field of Classification Search ............ 348/208.12–208.14, 240.99–240.2, 211.9–211.13, 169–172; 396/121–123

See application file for complete search history.

(56) References Cited

U.S. PATENT DOCUMENTS

| 7,248,301 | B2 * | 7/2007 | Voss et al. ..................... 348/346 |
| 7,355,627 | B2 * | 4/2008 | Yamazaki et al. ............ 348/143 |
| 7,702,231 | B2 * | 4/2010 | Sugimoto ..................... 396/123 |
| 2003/0107653 | A1 * | 6/2003 | Utsumi et al. ........... 348/207.99 |
| 2005/0008196 | A1 * | 1/2005 | Liu et al. ....................... 382/107 |
| 2006/0182433 | A1 * | 8/2006 | Kawahara et al. ............ 396/123 |
| 2007/0076099 | A1 * | 4/2007 | Eshed et al. ............... 348/218.1 |
| 2010/0226636 | A1 | 9/2010 | Hirai et al. |

FOREIGN PATENT DOCUMENTS

| CN | 101071252 A | 11/2007 |
| JP | 2004-198715 A | 7/2004 |
| JP | 2006-211139 A | 8/2006 |
| JP | 2006-227080 A | 8/2006 |

OTHER PUBLICATIONS

Office Action established for CN 200710193997.7.

* cited by examiner

*Primary Examiner* — Jason Chan
*Assistant Examiner* — Pritham Prabhakher
(74) *Attorney, Agent, or Firm* — Drinker Biddle & Reath LLP (57) ABSTRACT

A digital photographing apparatus capable of precisely and immediately performing autofocusing on a person being photographed, and a method of controlling the same are provided. The digital photographing apparatus comprises a face detecting unit that detects a face, a body detecting unit that detects a body, which may or may not exclude the face, an autofocus information obtaining unit, and an autofocus object determining unit. The autofocus object determining unit analyzes face autofocus information obtained from the face by the autofocus information obtaining unit and body autofocus information obtained from the body, and then selects the face part and/or the body as an object of autofocusing.

22 Claims, 8 Drawing Sheets

FIG. 10

# DIGITAL PHOTOGRAPHING APPARATUS AND METHOD FOR CONTROLLING THE SAME

CROSS-REFERENCE TO RELATED PATENT APPLICATIONS

This application claims the benefit of Korean Patent Application No. 10-2007-0005447, filed on Jan. 17, 2007, in the Korean Intellectual Property Office, the disclosure of which is incorporated herein in its entirety by reference.

BACKGROUND OF THE INVENTION

1. Field of the Invention

The present invention relates generally to a digital photographing apparatus and a control method therefore. More particularly, the present invention relates to a digital photographing apparatus capable of precisely and immediately performing autofocusing on a person being photographed and a method of autofocusing a digital photographing apparatus.

2. Description of the Related Art

Conventionally, a digital photographing apparatus stores in a storage medium an image file obtained by a photographing operation in a photographing mode, and displays the image on a display unit by reproducing the image file stored in the storage medium in a playback mode. Also, in the photographing mode, the digital photographing apparatus may reproduce the image file obtained by the photographing operation.

Digital photographing apparatuses are frequently used in order to take photos of a person. In this case, it is preferable to focus the digital photographing apparatus on the face of a person being photographed. Accordingly, research has been recently conducted on a control method for automatically detecting the face of a person and autofocusing on the detected face of the person.

However, in the conventional control method for a digital photographing apparatus and a digital photographing apparatus capable of performing the control method, only a face is detected in an image and autofocusing is only performed on the detected face. Thus, in certain occasions, it is difficult to precisely and instantaneously perform autofocusing when sufficient information regarding autofocusing cannot be obtained from the face in an image. For example, this occasion may occur when the image is captured in a dark place or the face of a person is too small due to a large distance between the person and the digital photographing apparatus.

SUMMARY OF THE INVENTION

The present invention provides a digital photographing apparatus capable of precisely and instantaneously autofocusing on a person being photographed, a method of controlling the same, and a storage medium storing a program for executing the method.

According to an aspect of the present invention, the digital photographing apparatus comprises a face detecting unit, a body detecting unit, an autofocus information obtaining unit, and an autofocus object determining unit. The face detecting unit detects a face, and the body detecting unit detects a body. When detecting a body, the body detecting unit may exclude the face. The autofocus information obtaining unit obtains face autofocus information from the detected face and body autofocus information from the detected body. The autofocus object determining unit analyzes the face and/or body autofocus information and selects the face and/or the body as an object of autofocusing.

When obtaining body autofocus information from the detected body, the autofocus information obtaining unit may obtain autofocus information from a central region of the detected body excluding the face.

The autofocus object determining unit may select as the object of autofocusing the face and/or the body based on which of the autofocus information obtained from the face and body corresponds to more precise autofocusing information.

According to another aspect of the present invention, the autofocus object determining unit selects the face as an object of autofocusing when the face autofocus information obtained from the face by the autofocus information obtaining unit is appropriate for autofocusing. On the other hand, the autofocus object determining unit selects both the face and the body as an object of autofocusing when the face autofocus information from the face is not appropriate for autofocusing.

The digital photographing apparatus may further comprise a body detecting unit to detect the body excluding the face (i.e., the torso).

According to another aspect of the present invention, the autofocus object determining unit selects the face as an object of autofocusing when the face autofocus information obtained from the face by the autofocus information obtaining unit is appropriate for autofocusing. Alternatively, the autofocus object determining unit selects the body as an object of autofocusing when the face autofocus information from the face is not appropriate for autofocusing, and the body autofocus information obtained from the body by the autofocus information obtaining unit is appropriate for autofocusing. In addition, the autofocus object determining unit selects both the face and the body as an object of autofocusing when both the face and body autofocus information are not appropriate for autofocusing.

The body detecting unit may detect the body excluding the face based on information obtained by the face detecting unit.

According to another aspect of the present invention, the aspect involves a method of controlling a digital photographing apparatus, that comprises: detecting a face; detecting a body; obtaining face autofocus information from the face obtaining body autofocus information from the body; analyzing the face autofocus information from the face and/or the body autofocus information from the body; and selecting the face and/or body as an object of autofocusing.

When detecting a body, the body may be detected excluding the face. Moreover, the body autofocus information may be obtained from a central region of the detected body.

The face and/or body may be selected as an object of autofocusing based on which of the face and/or body autofocus information corresponds to more precise autofocus information.

According to another aspect of the present invention, this aspect involves a method of controlling a digital photographing apparatus that comprises: detecting a face from an image, obtaining face autofocus information from the face, if the face autofocus information from the face is appropriate for autofocusing, selecting the face as an object of autofocusing, and if the face autofocus information from the face is not appropriate for autofocusing, selecting both the face and the body as an object of autofocusing. In addition, a body may be detected, and the body may be detected excluding the face.

According to another aspect of the present invention, which involves a method of controlling a digital photographing apparatus that comprises: detecting a face, and obtaining face autofocus information from the face. If the face autofocus information from the face is appropriate for autofocusing, the face is selected as an object of autofocusing. If the face autofocus information from the face is not appropriate for autofocusing, a body is detected and body autofocus information is obtained from the body. If the body autofocus information from the body is appropriate for autofocusing, the body is selected as an object of autofocusing. If the body autofocus information from the body is not appropriate for autofocusing, both the face and the body can be selected as an object of autofocusing. In addition, the body may be detected excluding the face.

According to another aspect of the present invention, a face and a body are detected from an image. Afterwards, face autofocus information is obtained from the face, body autofocus information is obtained from the body, and combined face and body autofocus information is obtained from a combination of the face and the body. If the face autofocus information from the face is appropriate for autofocusing, the face is selected as an object of autofocusing. If the face autofocus information from the face is not appropriate for autofocusing, determination is made regarding whether the body autofocus information from the body is appropriate for autofocusing. If the body autofocus information from the body is appropriate for autofocusing, the body is selected as an object of autofocusing. If the body autofocus information from the body is not appropriate for autofocusing, both the face and the body are selected as an object of autofocusing. In addition, when a body is being detected, information obtained when detecting the face may be used.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention is described more fully with reference to the accompanying drawings, in which exemplary embodiments of the invention are shown.

Figure 1:
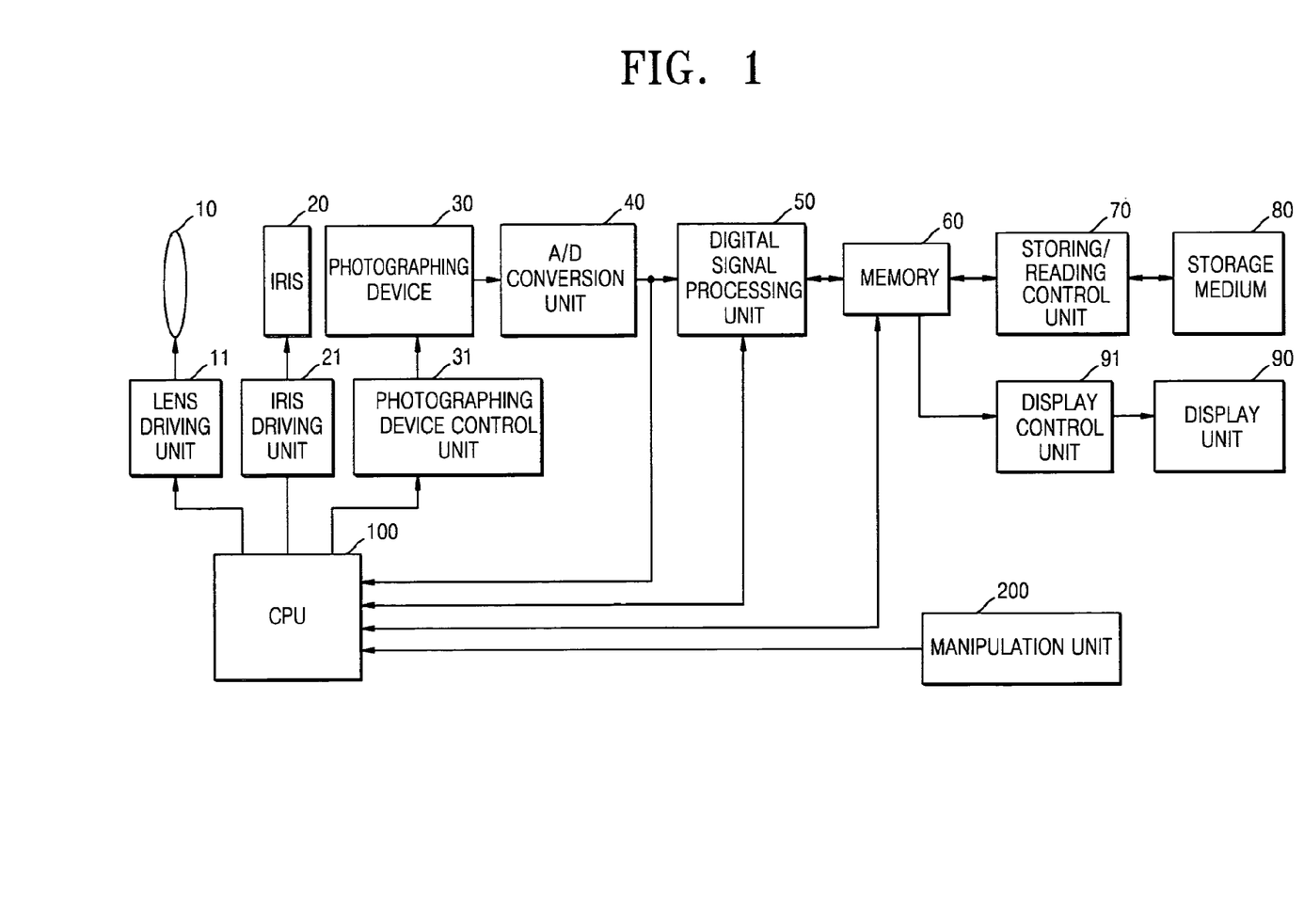
FIG. 1 is a block diagram of a digital photographing apparatus according to an embodiment of the present invention.

FIG. 1 is a block diagram of a digital photographing apparatus according to an embodiment of the present invention.

In this embodiment, CPU 100 controls various operations of the digital photographing apparatus. A manipulation unit 200, including keys generating an electrical signal from a user, is included in the digital photographing apparatus. The electrical signal from the manipulation unit 200 is transferred to the CPU 100 such that the CPU 100 can control the digital photographing apparatus.

In a photographing mode, if an electrical signal from the user is transferred to the CPU 100, the CPU 100 identifies the electrical signal and controls a lens driving unit 11, an iris driving unit 21, and a photographing device control unit 31. The position of a lens 10, the opening of an iris 20, and the sensitivity of a photographing device 30 are controlled by the photographing device control unit 31 for autofocusing. If an image signal is output from the photographing device 30, the image signal is converted into digital image data by an analog-to-digital (A/D) conversion unit 40, and is then input to the CPU 100 and a digital signal processing unit 50. The digital signal processing unit 50 performs digital signal processing such as gamma correction and white balance adjustment.

The image data output from the digital signal processing unit 50 is transferred through a memory 60 or directly to a display control unit 91. In the present embodiment, the memory 60 may include a read-only memory (ROM) or a random-access memory (RAM). The display control unit 91 controls a display unit 90 so as to display an image on the display unit 90. The image data output from the digital signal processing unit 50 can be input to a storing/reading control unit 70 through the memory 60. The storing/reading control unit 70 records the image data on a storage medium 80 automatically or according to a command from a user. Also, the storing/reading control unit 70 can read image data of an image file stored in the storage medium 80, and input the read image data to the display control unit 91, so that the image can be displayed on the display unit 90.

Figure 2:
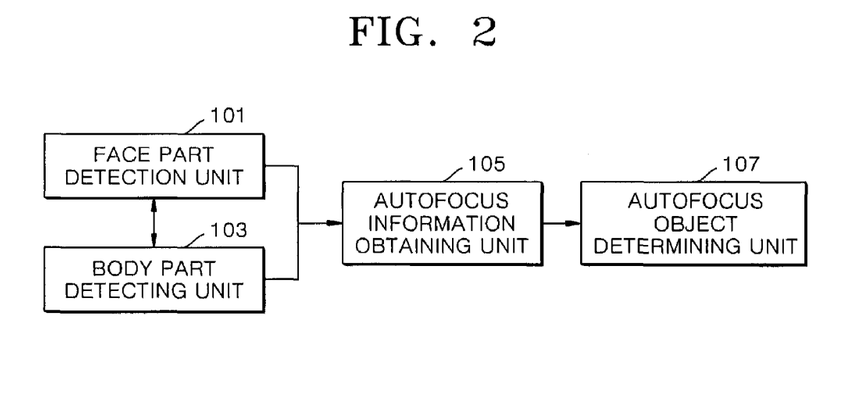
FIG. 2 is a block diagram of a part of the digital photographing apparatus of FIG. 1, according to an embodiment of the present invention.
Figure 3:
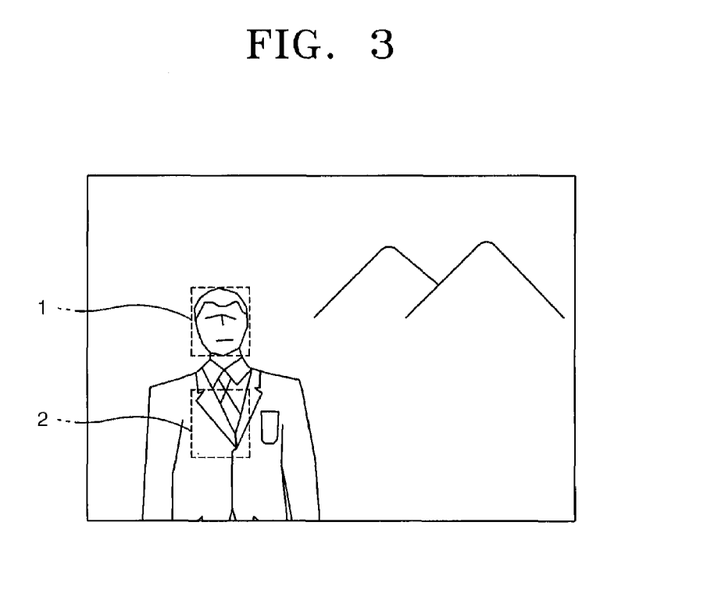
FIG. 3 is a conceptual diagram illustrating an operation of the part of the digital photographing apparatus of FIG. 2, according to an embodiment of the present invention.

FIG. 2 is a block diagram of a part of the digital photographing apparatus of FIG. 1, according to an embodiment of the present invention. FIG. 3 is a conceptual diagram illustrating an operation of the part of the digital photographing apparatus of FIG. 2, according to an embodiment of the present invention. The elements illustrated in FIG. 2 may be a part of the CPU 100 illustrated in FIG. 1. Also, although not shown in FIG. 1, the elements illustrated in FIG. 2 may not necessarily be a part of the CPU 100 and may be separated from the CPU 100. Referring to FIG. 2, the digital photographing apparatus according to the current embodiment may further comprise a face detecting unit 101, a body detecting unit 103, an autofocus information obtaining unit 105, and an autofocus object determining unit 107.

The face detecting unit 101 detects a face 1, as illustrated in FIG. 3. In an example, the face detecting unit 101 may analyze image data from the digital signal processing unit 50 according to data or an algorithm stored in the memory 60 for detecting a face 1. The face detecting unit 101 can be embodied in many different forms. For example, the face detecting unit 101 may detect the face 1 by analyzing image data output from the A/D conversion unit 40 of FIG. 1, but may not necessarily from the digital signal processing unit 50 of FIG. 1.

A variety of methods can be used in order to detect the face 1. For example, data related to the main colors of a face may be input in advance, and the face 1 can be detected by determining whether or not the data related to the main colors of the face exists in image data. In addition, data related to the pupils or shape of the eyes of a face may be input in advance, and the face 1 can be detected by determining whether or not the data related to the pupils or shape of the eyes of the face exists in image data. Data related to a T shape formed by the eyebrows (or eyes) and the nose may be input in advance, and the face 1 can be detected by determining whether or not the data related to the T shape exists in image data.

The body detecting unit 103 detects a body that may or may not exclude the face part 1 in the image, and particularly, a central body part 2, as illustrated in FIG. 3. The body detecting unit 103 also detects a body in the image by analyzing the image data received from the digital signal processing unit 50 in view of data, stored in the memory 60, for detecting a body. The body detecting unit 103 may also be embodied in many different forms. For example, the body detecting unit 103 may detect the body by analyzing the image data received from the A/D conversion unit 40, but not necessarily from the digital signal processing unit 50.

Figure 4:
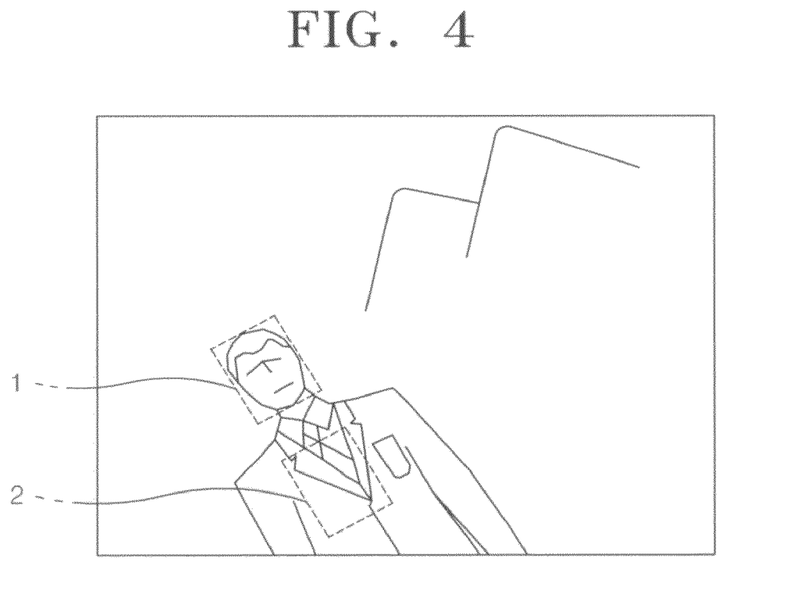
FIG. 4 is a conceptual diagram illustrating an operation of the part of the digital photographing apparatus of FIG. 2, according to another embodiment of the present invention.

A variety of methods can also be used in order to detect the body. For example, data related to the arms and legs of a body may be input in advance, and the body can be detected by determining whether or not the data related to the arms and legs of a body exists in image data. The body detecting unit 103 may detect the body, excluding the face by using the information received from the face detecting unit 101. Hence, as illustrated in FIG. 3, the face 1 may be detected, and then, a part of the image, which is spaced a predetermined distance from the detected face 1 and in a predetermined direction, may be detected as the central body 2. In the present embodiment, the predetermined direction may be a downward direction (lengthwise direction) from the face 1, that is, a direction from the forehead of the face 1 to the chin thereof. Hence, when detecting the face 1, the direction of the face 1 is also detected, and then it is assumed that the central body 2 is located under the face 1. For example, as illustrated in FIG. 4, even if the digital photographing apparatus is rotated, the direction of the face 1 is also detected when detecting the face 1, and the central body 2 may be detected based on the assumption that the central body 2 is located under the face 1. The fact that a part of the image, which is spaced in a predetermined distance from the face 1, is detected as the central body 2 means that the location of the central body 2 is determined by the size of the detected face 1. For example, the size of the face 1 in the lengthwise direction may be calculated, and a part of the body, which is spaced about 1.5 times longer than the calculated size of the face 1 and in the lengthwise direction, is detected as the central body 2.

Figure 5A:
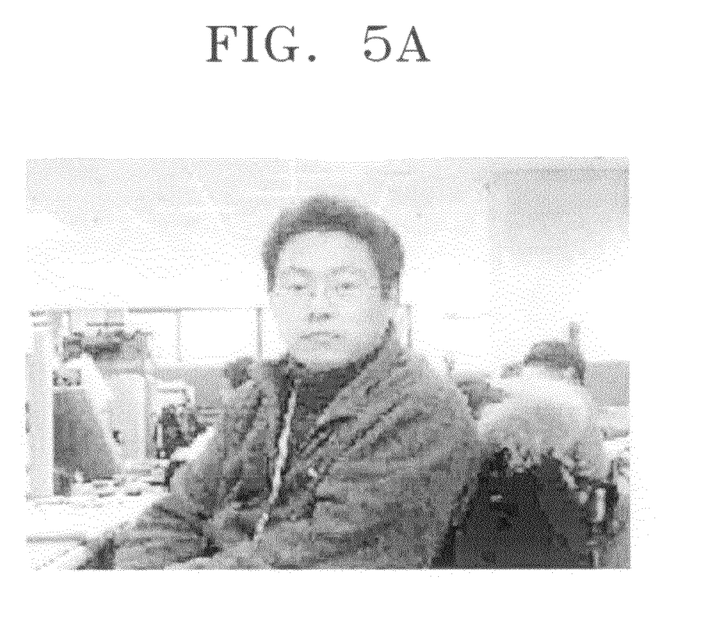
FIG. 5A is an image captured by the digital photographing apparatus of FIG. 2, according to an embodiment of the present invention.
Figure 5B:
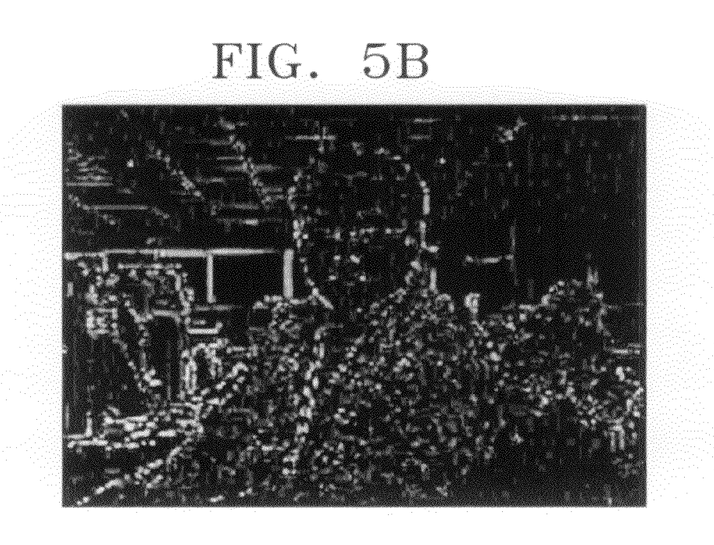
FIG. 5B illustrates an edge image of the image of FIG. 5A, according to an embodiment of the present invention.

The autofocus information obtaining unit 105 obtains autofocus information as follows:

First, an edge image is obtained from an image. For example, FIG. 5A illustrates an image captured by a digital photographing apparatus, according to an embodiment of the present invention, and FIG. 5B illustrates an edge image of the image of FIG. 5A, according to an embodiment of the present invention. In the present embodiments, the image is understood as an image captured by the photographing device 30 of FIG. 1, rather than an image photographed by the digital photographing apparatus. An edge image may be an image that shows various contours of the image, rather than the exact edge of the image.

The edge image may be obtained as described below. First, an image is converted into a black and white image. Then, a value of 1 is assigned to each pixel of the black and white image if the difference between the brightness values of a pixel and a neighboring pixel is equal to or greater than a predetermined value, e.g., 3% of the brightness value of the pixel. Otherwise, a value of 0 is assigned to each pixel if the difference between the brightness values of a pixel and a neighboring pixel is less than the predetermined value. After assigning a value of 1 or 0 to each pixel of the entire black and white image, each pixel having the value of 1 is expressed as bright and each pixel having the value of 0 is expressed as dark, and thereby, achieving an edge image, as illustrated in FIG. 5B. As obvious to one skilled in the art, various methods may be used to obtain the edge image. For example, if the difference between the brightness values of a pixel and a neighboring pixel is equal to or greater than a predetermined value, e.g., 3% of the brightness value of the pixel, a value of 1 is assigned to the pixel, and if the difference is less than the predetermined value, a value of 0 is assigned to the pixel, and thereby, obtaining the edge image.

Figure 5C:
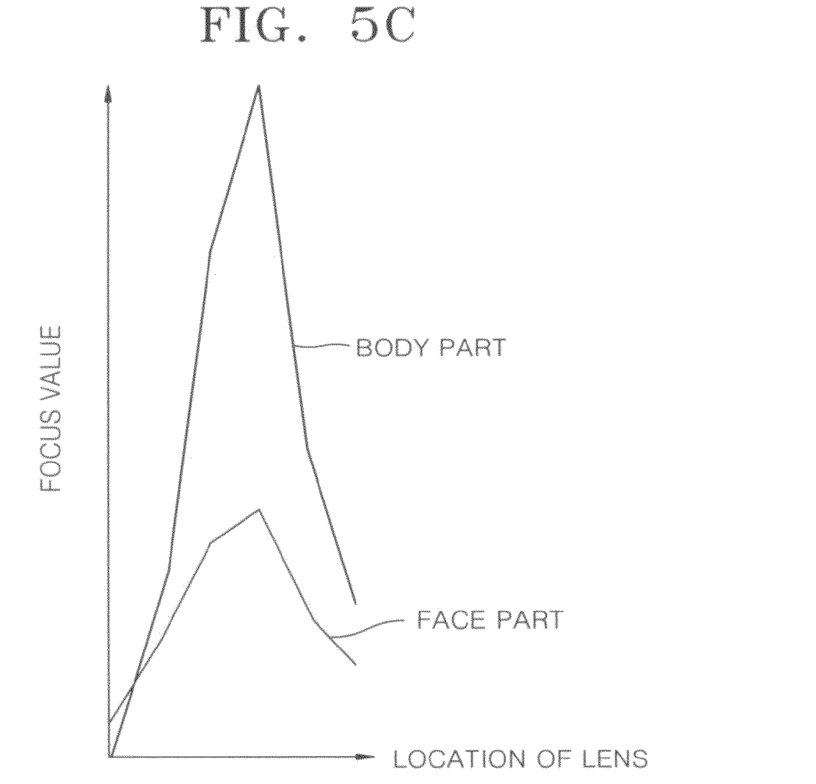
FIG. 5C is a graph for explaining a selection of an object autofocused by the digital photographing apparatus of FIG. 2, according to an embodiment of the present invention.

The autofocus information obtaining unit 105 obtains edge images at respective locations of the lens 10 of FIG. 1 as described above by slightly moving the lens 10 and then obtains autofocus information from the edge images. In the present embodiment, the lens 10 may be a lens system composed of a plurality of lenses, or be a lens from among a plurality of lenses of a lens system. As described above, the autofocus information obtaining unit 105 obtains face autofocus information from the face 1 detected by the face detecting unit 101 and obtains body autofocus information from the central body 2 detected by the body detecting unit 103. First, the face autofocus information obtaining unit 105 counts the pixels having the value of 1 in a region, corresponding to the face 1, in each of the edge images. In the present embodiment, the total number of pixels having the value of 1 in the region is referred to as a focus value. The graph illustrated in FIG. 5C is achieved by expressing the x-axis to denote various locations of the lens 10 and the y-axis to denote the total number of pixels after counting the pixels having the value of 1, as FIG. 5C illustrates both the graph of a body and the graph of a face. In FIG. 5C, the peak of each of the graphs denotes a location of the lens 10 where the lens 10 is focused. FIG. 5C illustrates a focus value of the face and the body of the edge image illustrated in FIG. 5B. For example, the focus value at the peak for the face is 34483, and the focus value at the peak for the body is 56668. In the graphs of FIG. 5C, the bottom of the y-axis does not represent a value of 0, and the origin of each graph is omitted for convenience of illustration. The graphs of FIG. 5C are based on autofocus information.

If the autofocus information obtaining unit 105 obtains the face autofocus information from the face and body autofocus information from the body, the autofocus object determining unit 107 analyzes the face and/or body autofocus information and selects the face and/or body as an object of autofocusing. For example, the autofocus object determining unit 107 may select the face and/or body as the object of autofocusing by determining which of the face and body corresponds to more precise autofocus information. In this case, the more precise autofocus information denotes information whose peak is sharper than that of less precise autofocus information as illustrated in FIG. 5C. For example, referring to FIG. 5C, the autofocus information from the body is more precise than the autofocus information from the face. Thus, the autofocus object determining unit 107 selects the body as the object of autofocusing.

In a conventional method of controlling a digital photographing apparatus and a conventional digital photographing apparatus capable of performing the method, only a face is detected in an image and autofocusing is performed on the detected face. Thus, it is difficult to precisely and immediately perform autofocusing when sufficient autofocus information cannot be obtained from a face in an image; for example, when the image is photographed in a dark place or when the face of a person is significantly smaller due to a large distance between the person and a digital photographing apparatus.

However, in the case of the digital photographing apparatus according to an embodiment of the present invention, face and/or body autofocus information obtained from a face and a body are compared so as to select the face and/or the body by determining which of the face and the body has more precise autofocus information, and thereby, performing autofocusing more rapidly as compared to the conventional method while satisfying demands of a user.

In a digital photographing apparatus according to the current embodiment, after the autofocus information obtaining unit 105 obtains face and body autofocus information from the face and the body, the autofocus object determining unit 107 compares the face autofocus information from the face with the body autofocus information from the body, and selects the face and the body as the object of autofocusing. Moreover, the present invention is not limited thereto.

For example, in a digital photographing apparatus according to another embodiment of the present invention, the face and body autofocus information obtained from the face and the body may be analyzed differently instead of just performing comparisons. If the face autofocus information obtained from the face by the autofocus information obtaining unit 105 is appropriate for autofocusing, the autofocus object determining unit 107 may select the face as the object of autofocusing. If the face autofocus information from the face is not appropriate for autofocusing, the autofocus object determining unit 107 may select both the face and the body as the object of autofocusing.

Hence, conventionally, when a person is photographed, autofocusing is performed on the face of the person. Thus, first, a determination is made regarding whether the autofocus information from the face is appropriate for autofocusing. If the autofocus information from the face is appropriate for autofocusing, the autofocus object determining unit 107 selects the face as the object of autofocusing. In this case, whether autofocus information from the face is appropriate for autofocusing may be determined by the extent of the sharpness of the peak of its corresponding graph, as illustrated in FIG. 5C. For example, in a graph of the face as illustrated in FIG. 5C and if an assumption is made that $(1-m/M) \times 100$ is less than 5, where M is a maximum focus value and m is a minimum focus value, the face autofocus information in this example may be determined to be not appropriate for autofocusing.

Figure 6:
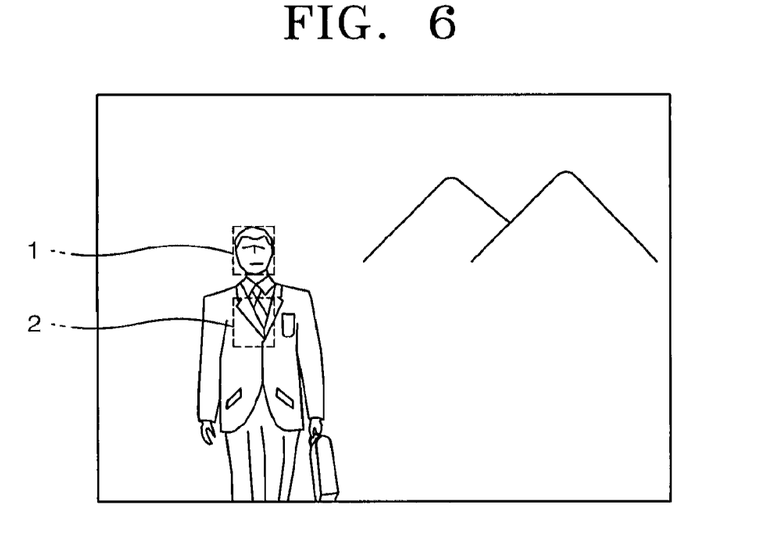
FIG. 6 is a conceptual diagram illustrating an operation of the part of the digital photographing apparatus of FIG. 2, according to another embodiment of the present invention.

If the face autofocus information from the face is not appropriate for autofocusing, the autofocus object determining unit 107 selects both the face and the body as an object of autofocusing. As described above, the autofocus information is achieved from the total number of pixels having a value of 1 of a target region of an edge image. Accordingly, if both the face and the body are selected as an object of autofocusing, the total number of pixels having a value of 1 in the target region also increases. Thus, a focus value for determining a location of a lens, in which autofocusing is to be performed, increases accordingly, and thereby, determination of the exact location of the lens 10 can be performed for precise autofocusing. The digital photographing apparatus according to the current embodiment exhibits an excellent performance particularly when the distance between a person being photographed and the digital photographing apparatus is far, as illustrated in FIG. 6. Hence, the further the distance between a person that being photographed and a digital photographing apparatus, the more difficult it is to determine the exact location of the lens 10 for precise autofocusing because even if a face is detected, the face is small, and thus, a focus value of the face is small. According to the present embodiment, it is possible to determine the exact location of the lens for precise autofocusing by selecting both the face and the body as an object of autofocusing.

In a digital photographing apparatus according to another embodiment of the present invention, the autofocus object determining unit 107 may select the face as an object of autofocusing when the face autofocus information obtained from the face by the autofocus information obtaining unit 105 is appropriate for autofocusing. Alternatively, the autofocus object determining unit 107 may select the body as an object of autofocusing when the body autofocus information from the body is appropriate for autofocusing. In addition, the autofocus object determining unit 107 may select both the face and the body when both the face and body autofocus information from the face and the body are not appropriate for autofocusing. In other words, conventionally, when a person is photographed, autofocusing is performed on the face of the person. Therefore, first, a determination is made regarding whether the face autofocus information from the face is appropriate for autofocusing. If the face autofocus information from the face 1 is appropriate for autofocusing, the autofocus object determining unit 107 selects the face as an object of autofocusing. If the face autofocus information from the face is not appropriate for autofocusing, a determination is made regarding whether the autofocus information from the body is appropriate for autofocusing. If the body autofocus information from the body is appropriate for autofocusing, the autofocus object determining unit selects the body as the object of autofocusing. If the body autofocus information from the body is also not appropriate for autofocusing, both the face and the body are selected as the object of autofocusing for precise autofocusing.

Figure 7:
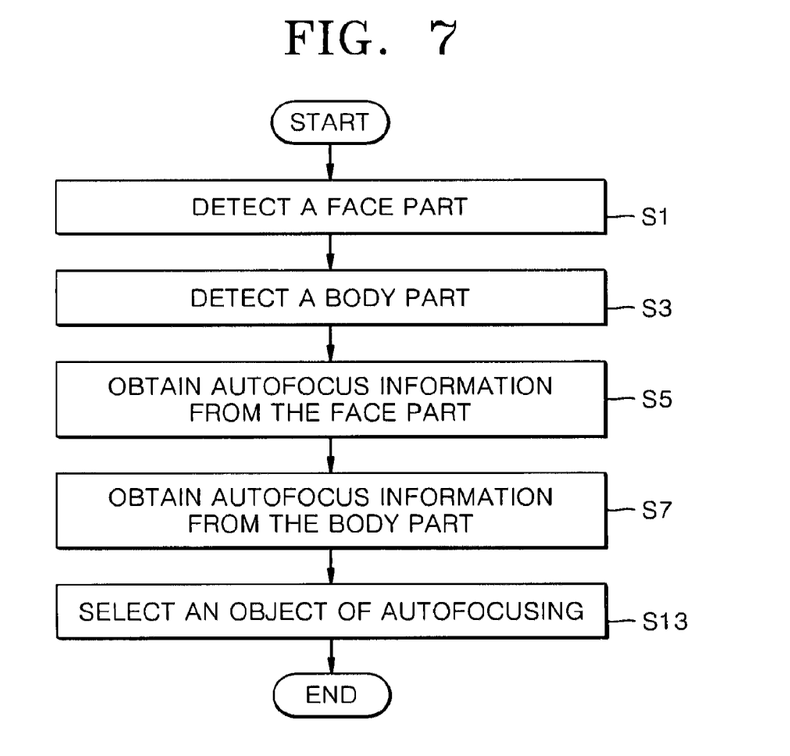
FIG. 7 is a flowchart of a method of controlling a digital photographing apparatus, according to an embodiment of the present invention.

FIG. 7 is a flowchart illustrating a method of controlling a digital photographing apparatus according to an embodiment of the present invention. Referring to FIG. 7, a face is detected in an image (operation S1), and a body part excluding the face (i.e., the torso) is detected (operation S3). The body may be detected excluding the face. As obvious to one skilled in the art, operation S3 may be performed prior to performing operation S1, and operations S1 and S3 may be performed simultaneously. Then, face autofocus information is obtained from the face (operation S5), and body autofocus information is obtained from the body (operation S7). Operation S7 may be performed prior to performing operation S5, and operations S7 and S5 may be performed simultaneously. Also, in operation S7, body autofocus information may be obtained from a central region of the detected body. Then, the face and body autofocus information from the face and the body are compared so as to select the face and/or the body as an object of autofocusing (operation S13). For example, the face and/or the body may be selected as an object of autofocusing based on which of the face and the body corresponds to more precise autofocus information.

Figure 8:
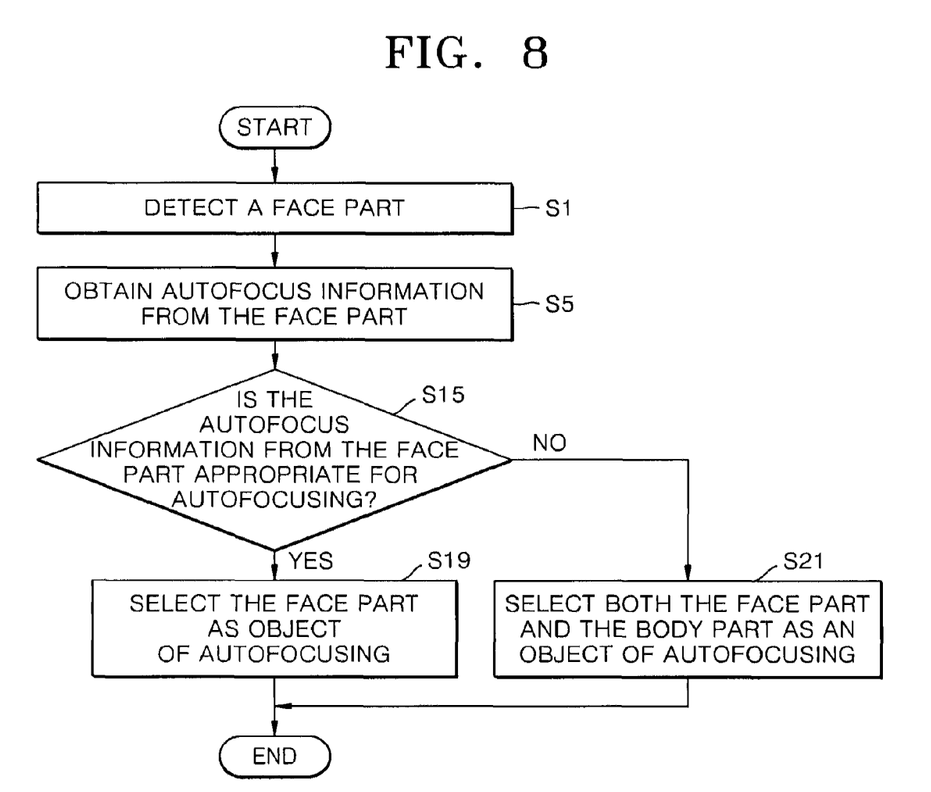
FIG. 8 is a flowchart of a method of controlling a digital photographing apparatus, according to another embodiment of the present invention.

FIG. 8 is a flowchart illustrating a method of controlling a digital photographing apparatus according to another embodiment of the present invention. Referring to FIG. 8, a face is detected in an image (operation S1), face autofocus information is then obtained form the face (operation S5), and a determination is made regarding whether the face autofocus information from the face is appropriate for autofocusing (operation S15). If the autofocus information from the face is appropriate for autofocusing, the face is selected as an object of autofocusing (operation S19); and if not so, both the face and the body are selected as the object of autofocusing (operation S21). Hence, when the face autofocus information from the face is not appropriate for autofocusing, a body is detected and both the face and the body are selected as the object of autofocusing.

Figure 9:
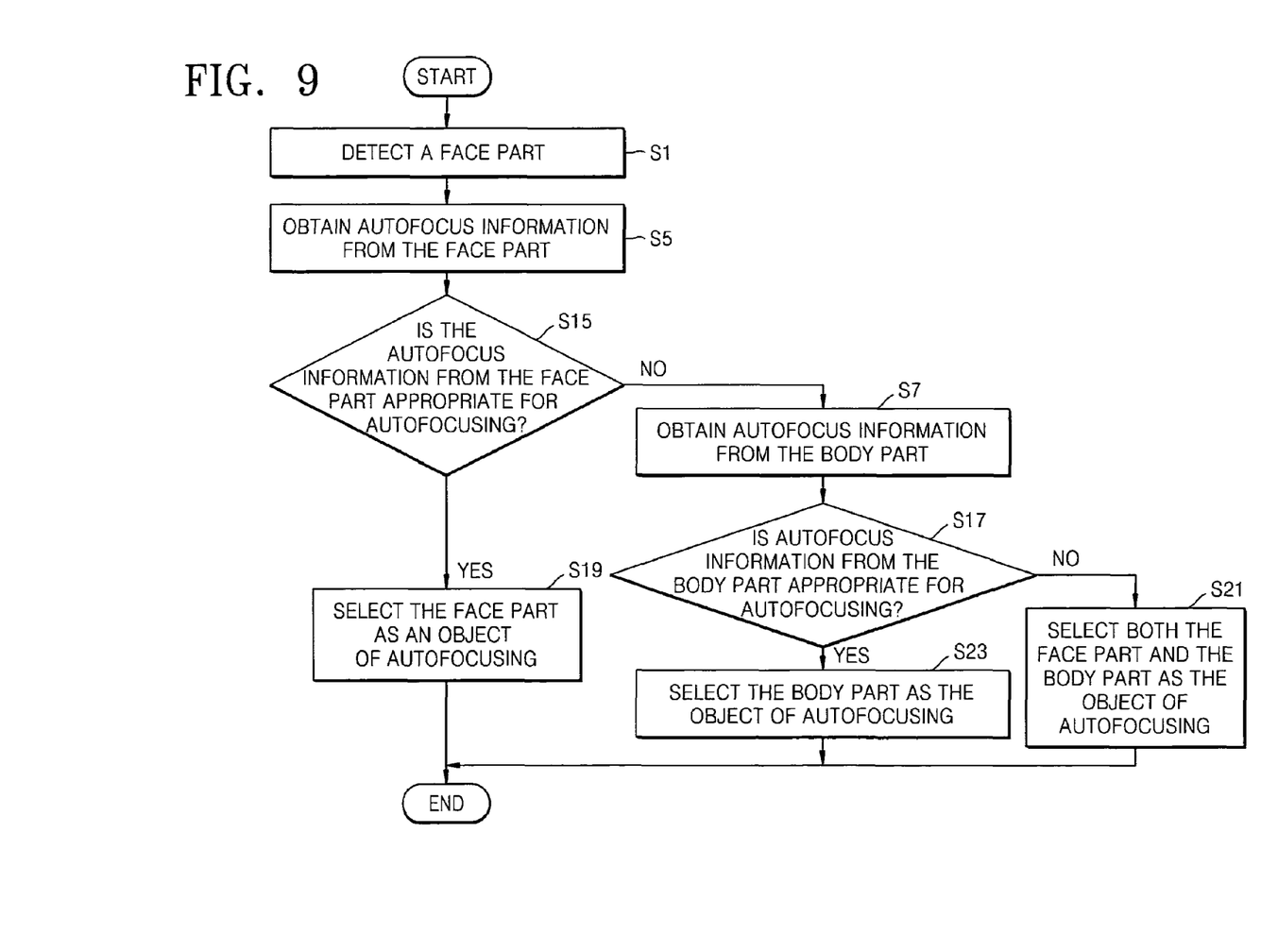
FIG. 9 is a flowchart of a method of controlling a digital photographing apparatus, according to another embodiment of the present invention.

FIG. 9 is a flowchart illustrating a method of controlling a digital photographing apparatus according to another embodiment of the present invention. The method as illustrated in FIG. 9 is different from the method as illustrated in FIG. 8 in terms of a process performed when face autofocus information obtained from a face is not appropriate for autofocusing. Specifically, according to a current embodiment of the present invention, when the face autofocus information from the face is not appropriate for autofocusing, body autofocus information is obtained from a body (operation S7), and a determination is made regarding whether the autofocus information from the body is appropriate for autofocusing (operation S17). As obvious to one skilled in the art, the method may further detect a body from an image. The body may be detected excluding the face. If the body autofocus information from the body is appropriate for autofocusing, the body is selected as an object of autofocusing (operation S23). If the body autofocus information from the body is not appropriate, both the face and the body are selected as an object of autofocusing for precise autofocusing (operation S21).

Figure 10:
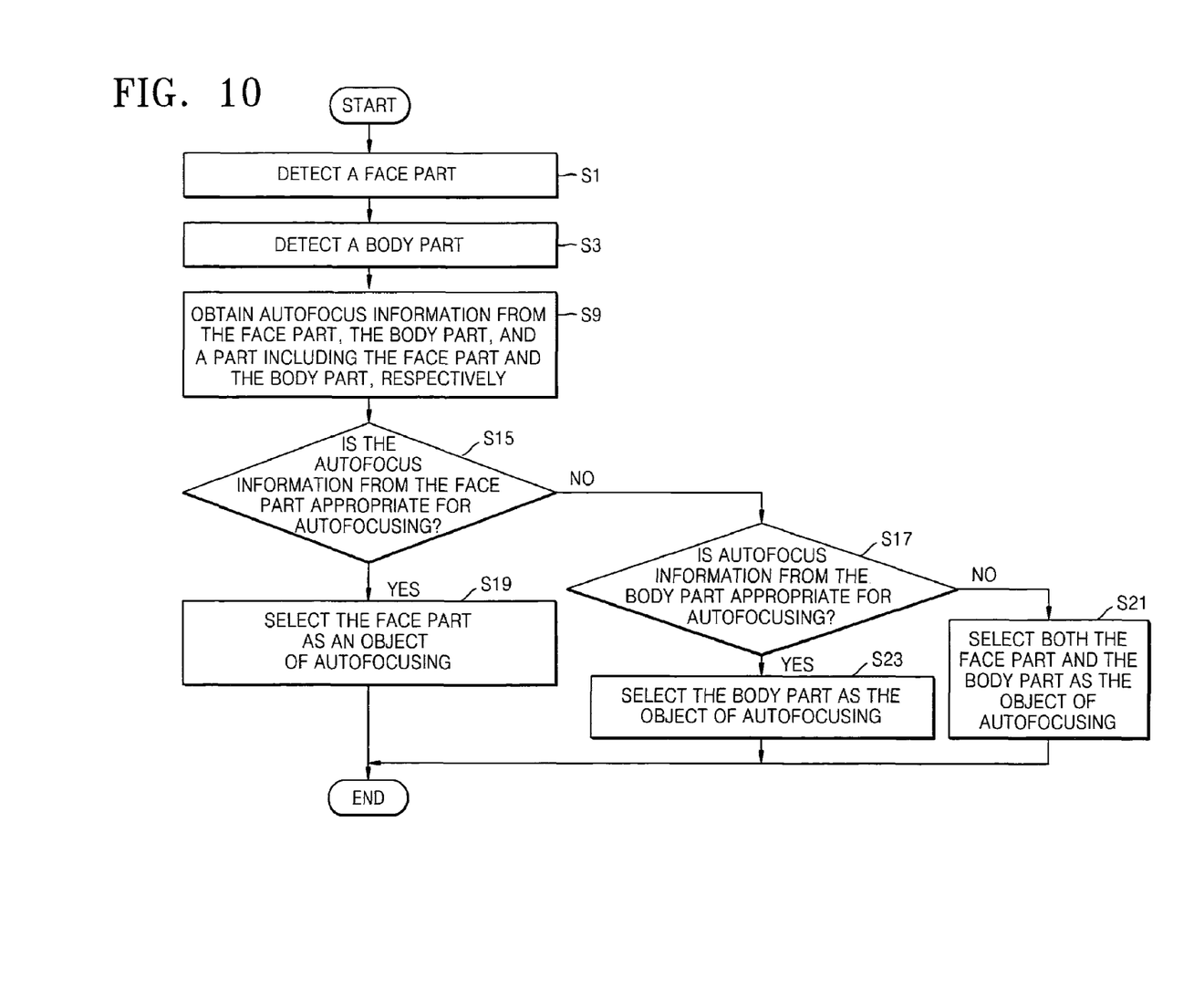
FIG. 10 is a flowchart of a method of controlling a digital photographing apparatus, according to another embodiment of the present invention.

FIG. 10 is a flowchart illustrating a method of controlling a digital photographing apparatus according to another embodiment of the present invention. The method illustrated in FIG. 10 is different from the method illustrated in FIG. 9 in that three types of autofocus information is obtained: face autofocus information from a face, body autofocus information from a body, and combined autofocus information obtained from a combination of the face and the body (operation S9). Afterwards, a determination is made regarding whether the face autofocus information from the face is appropriate for autofocusing (operation S15). Another determination is made regarding whether the body autofocus information from the body is appropriate for autofocusing (operation S17). Operation S9 may be performed variously. For example, in operation S9, various types of autofocus information may be simultaneously or sequentially obtained from the face, the body, and the combination of the face and the body.

A program for executing a method of controlling a digital photographing apparatus according to the above embodiments of the present invention can be stored in a storage medium. The storage medium may be the storage medium 80, the memory 60 illustrated in FIG. 1, or a separate storage medium. Examples of the storage medium include magnetic storage media (for example, read-only memory (ROM), a floppy disk, and hard disks), and optical data storage devices (for example, CD-ROM, a digital versatile disc (DVD)). Also, the CPU 100 illustrated in FIG. 1 or part of the CPU 100 may be employed as the storage medium.

As described above, in a digital photographing apparatus, a method of controlling the same, and a storage medium storing a program for executing the method, according to the present invention, it is possible to precisely and immediately perform autofocusing on a person being photographed.

While the present invention has been particularly shown and described with reference to exemplary embodiments thereof, it would be understood by one of ordinary skill in the art that various changes in form and details may be made therein without departing from the spirit and scope of the present invention as defined by the following claims.

What is claimed is:

1. A digital photographing apparatus comprising:
a face part detecting unit detecting a face part;
a body part detecting unit detecting a body part excluding the face part;
an autofocus information obtaining unit; and
an autofocus object determining unit,
wherein the autofocus object determining unit compares autofocus information obtained from the detected face part and autofocus information obtained from the detected body part, and selects at least one of the face part and the body part as an object of autofocusing, where the autofocus information from the face part and the autofocus information from the body part are obtained by the autofocus information obtaining unit
wherein:
the autofocus information obtaining unit is to obtain the autofocus information from the face part by:
converting an image including the face part to a black and white image;
assigning a binary value to each pixel of the black and white image according to differences in brightness values between adjacent pixels; and
determining the number of pixels having the binary value of 1 in the face part;
the autofocus information obtaining unit is to obtain the autofocus information from the face part by:
converting an image including the body part to a black and white image;
assigning a binary value to each pixel of the black and white image according to differences in brightness values between adjacent pixels; and
determining the number of pixels having the binary value of 1 in the body part; and
the autofocus object determining unit is to compare the autofocus information obtained from the detected face part and the autofocus information obtained from the detected body part by comparing the number of pixels having the binary value of 1 in the face part with the number of pixels having the binary value of 1 in the body part.

2. The digital photographing apparatus of claim 1, wherein, when obtaining the autofocus information from the detected body part excluding the face part, the autofocus information obtaining unit obtains the autofocus information from a central region of the detected body part excluding the face part.

3. The digital photographing apparatus of claim 1, wherein the autofocus object determining unit selects one of the face part and the body part as an object of autofocusing.

4. The digital photographing apparatus of claim 3, wherein the autofocus object determining unit selects one of the face part and the body part as the object of autofocusing on the ground that which one of the autofocus information obtained from the face part and the autofocus information obtained from the body part corresponds to more precise autofocusing information.

5. The digital photographing apparatus of claim 1, wherein the body part detecting unit detects the body part excluding the face part, based on information obtained by the face part detecting unit.

6. The digital photographing apparatus of claim 1, wherein the autofocus object determining unit
selects the face part as an object of autofocusing when autofocus information obtained from the face part by the autofocus information obtaining unit is appropriate for autofocusing, and
selects both the face part and a body part as an object of autofocusing when the autofocus information from the face part is not appropriate for autofocusing.

7. The digital photographing apparatus of claim 1, wherein the autofocus object determining unit
selects the face part as an object of autofocusing when autofocus information obtained from the face part by the autofocus information obtaining unit is appropriate for autofocusing,
selects the body part as an object of autofocusing when the autofocus information from the face part is not appropriate for autofocusing and autofocus information obtained from the body part by the autofocus information obtaining unit is appropriate for autofocusing, and
selects both the face part and the body part as an object of autofocusing when both the autofocus information from the face part and the body part are not appropriate for autofocusing.

8. The digital photographing apparatus of claim 1, wherein the autofocus information obtaining unit is configured to move a focus lens through a range, and to compute a focus value for the face part and a focus value for the body part for multiple positions through the range to obtain autofocus information from the face part and to obtain autofocus information from the body part respectively.

9. The digital photographing apparatus of claim 1, wherein the body part excludes any face part.

10. A method of controlling a digital photographing apparatus, the method comprising:
(a) detecting a face part;
(b) detecting a body part excluding the face part;
(c) obtaining autofocus information from the face part;
(d) obtaining autofocus information from the body part excluding the face part; and
(e) comparing the autofocus information from the face part with the autofocus information from the body, and selecting one of the face part and the body part as an object of autofocusing;
wherein :
step (c) comprises:
(c-1) converting an image including the face part to a black and white image;
(c-2) assigning a binary value to each pixel of the black and white image according to differences in brightness values between adjacent pixels; and
(c-3) determining the number of pixels having the binary value of 1 in the face part;
step (d) comprises:
(d-1) converting an image including the body part to a black and white image;
(d-2) assigning a binary value to each pixel of the black and white image according to differences in brightness values between adjacent pixels; and
(d-3) determining the number of pixels having the binary value of 1 in the body part; and step e) comprises comparing the number of pixels having the binary value of 1 in the face part with the number of pixels having the binary value of 1 in the body part.

11. The method of claim 10, wherein during step (d), the autofocus information is obtained from a central region of the detected body part.

12. The method of claim 10, wherein step (e) comprises selecting as an object of autofocusing one of the face part and the body part in terms of which one of the autofocus information obtained from the face part and the autofocus information obtained from the body part corresponds to a more precise autofocus information.

13. The method of claim 10, wherein during step (b), information obtained when detecting the face part is used.

14. The method of claim 10, wherein obtaining autofocus information from the face part and obtaining autofocus information from the body part excluding the fact part, comprises:
moving a focus lens through a range and computing a focus value for the face part and a focus value for the body part for multiple positions through the range to obtain autofocus information from the face part and to obtain autofocus information from the body part respectively.

15. The method of claim 10, wherein the body part excludes any face part.

16. A non-transitory computer readable medium having recorded thereon a computer program for executing the method of claim 10.

17. A method of controlling a digital photographing apparatus, the method comprising:
(a) detecting a face part from an image;
(c) obtaining autofocus information from the face part;
(f) if the autofocus information from the face part is appropriate for autofocusing, selecting the face part as an object of autofocusing; and
(g) if the autofocus information from the face part is not appropriate for autofocusing,
(g-1) detecting a body part and obtaining autofocus information from a body part;
(g-2a) if the autofocus information from the body part is appropriate for autofocusing, selecting the body part as an object of autofocusing; and
(g-3) if the autofocus information from the body part is not appropriate for autofocusing, selecting both the face part and the body part as an object of autofocusing
wherein:
step (c) comprises:
converting an image including the face part to a black and white image;
assigning a binary value to each pixel of the black and white image according to differences in brightness values between adjacent pixels; and
determining the number of pixels having the binary value of 1 in the face part;
step (g-1) comprises:
converting an image including the body part to a black and white image;
assigning a binary value to each pixel of the black and white image according to differences in brightness values between adjacent pixels; and
determining the number of pixels having the binary value of 1 in the body part; and
step (g-2a) comprises comparing the number of pixels having the binary value of 1 in the face part with the number of pixels having the binary value of 1 in the body part.

18. The method of claim 17, wherein step (g) comprises detecting a body part excluding the face part, and selecting the body part as an object of autofocusing, or both the face part and the body part as an object of autofocusing.

19. The method of claim 17, further comprising step (b) detecting a body part excluding the face part.

20. The method of claim 17, wherein step (g-1) comprises detecting a body part excluding the face part, and obtaining autofocus information from the body part.

21. The method of claim 17, wherein the body part excludes any face part.

22. A non-transitory computer readable medium having recorded thereon a computer program for executing the method of claim 17.

* * * * *